(12) United States Patent
Mat (10) Patent No.: US 7,726,466 B2
(45) Date of Patent: Jun. 1, 2010

(54) CONVEYOR BELT SCRAPER

(76) Inventor: Ghislain Justin Marie Mat, Plot 91, Bultfontein, Lanseria, 1739, Krugersdorp (ZA)

( * ) Notice: Subject to any disclaimer, the term of this patent is extended or adjusted under 35 U.S.C. 154(b) by 178 days.

(21) Appl. No.: 11/813,784

(22) PCT Filed: Sep. 6, 2005

(86) PCT No.: PCT/IB2005/002621

§ 371 (c)(1),
(2), (4) Date: Jul. 12, 2007

(87) PCT Pub. No.: WO2006/097786

PCT Pub. Date: Sep. 21, 2006

(65) Prior Publication Data

US 2008/0093200 A1     Apr. 24, 2008

(30) Foreign Application Priority Data

Mar. 18, 2005  (ZA) ............................... 2005/02311
Mar. 18, 2005  (ZA) ............................... 2005/02312

(51) Int. Cl.
*B65G 45/16* (2006.01)
*B65G 45/12* (2006.01)

(52) U.S. Cl. ...................................... 198/499; 198/497
(58) Field of Classification Search ................. 198/497, 198/499
See application file for complete search history.

(56) References Cited

U.S. PATENT DOCUMENTS 6,076,656 A * 6/2000 Mat ........................... 198/499
6,279,727 B1 * 8/2001 Waalkes et al. ............. 198/499

FOREIGN PATENT DOCUMENTS

| DE | 3908873 | 11/1989 |
| EP | 0 486 112 | 5/1992 |
| FR | 2226338 | 11/1974 |
| GB | 2125357 | 3/1984 |
| GB | 2165200 | 4/1986 |
| WO | WO87/05585 | 9/1987 |
| WO | WO93/00495 | 3/1993 |

* cited by examiner

Primary Examiner—Gene Crawford
Assistant Examiner—Yolanda Cumbess
(74) Attorney, Agent, or Firm—Ladas & Parry LLP

(57) ABSTRACT

The invention concerns a conveyor belt scraper (10) which includes blade segments (12) each arranged to scrape a portion of the width of a conveyor belt (22). Each blade segment is supported by a bracket (14) which is mounted to a link (16.1) of a deformable, parallelogram linkage (16). An inflatable hose (30) extends through and acts on the linkages to urge the blade segments against the conveyor belt. The link has a projecting, holed boss (42) and the bracket has a recess (40.3) to receive the boss with the hole of the boss aligned with a hole in the base of the recess to receive a fastener (50) that connects the bracket to the linkage in thermally transmitting relationship. This relationship reduces heat degradation of components of the scraper.

11 Claims, 8 Drawing Sheets

CONVEYOR BELT SCRAPER

BACKGROUND TO THE INVENTION

This invention relates to a conveyor belt scraper.

U.S. Pat. No. 6,076,656 describes a conveyor belt scraper which includes a segmented scraper blade composed of blade segments arranged side by side on blade segment supports each of which includes a parallelogram linkage. A gas inflated biasing means, typically an inflatable tube or hose, extends through the linkages and is inflated to cause the linkages to displace the blade segments towards the belt surface. The individual mounting of the blade segments enables them to wear at different rates, to take account of different belt loading conditions across the width of the belt, while still maintaining an effective scraping action.

Conveyor belt scrapers according to U.S. Pat. No. 6,076, 656 are marketed under the trade marks DIRTWHACKER® and SCAVENGER®. These scrapers include, for each parallelogram linkage, a flexible curtain which hangs over the linkage and prevents material which is scraped off the conveyor belt from falling directly onto the linkage. This reduces the risk of the falling material fouling and jamming the linkage. There is also a rigid plastics deflector extending over the curtain on one side of the linkage to deflect material away from the linkage and curtain to provide further protection to the linkage and also to prevent material from falling directly onto the curtain and causing premature damage to it.

The known scrapers as described above work well in practice. Problems have however been encountered in situations where the conveyor belt runs "dry", i.e. there is no conveyed material on the belt.

Frictional contact between the scraper and the belt generates substantial heat. In the conventional, practical arrangement the deflector and curtain, which is typically made of natural rubber, are clamped between the blade segment and a bracket formation on the linkage. The deflector and curtain accordingly act as thermal insulators between these components. When there is material on the belt which is scraped off by the scraper at least some of the thermally generated heat is conveyed away from the assembly by the material itself. However when the belt runs "dry", there is no such removal of heat and excessive heat can build up in the assembly, possibly leading to heat deterioration of the curtain and deformation or even melting of the plastics deflector. This in turn can lead to a loosening of the connection between the bracket and the linkage. The loosened bracket, i.e. blade segment, can then vibrate or chatter against the belt, resulting in further build-up of heat and rapid wear to the blade and also to the other mechanical components.

A solution to this particular problem would be to avoid running the belt "dry". However many handling plants have control systems and protocols which automatically run conveyor belts even when there is no material to convey.

Rapid wear of the scraper apparatus can also take place in situations where particularly abrasive particulate material is transported by the conveyor belt. It has been observed that the deflector itself can undergo rapid wear as a result of the material falling onto it. It is believed that such wear is mainly attributable to the fact that the deflector is oriented at a relatively acute angle relative to the horizontal and so is largely exposed to vertically falling material which rapidly abrades it. If the deflector and curtain are worn through, the mechanical linkage itself will be exposed directly to the falling material scraped off the belt, and this may have the effect of shortening the life of the scraper.

The present invention seeks to provide, in a conveyor belt scraper of the type here in question, features which can contribute to reducing the rate of wear of the scraper apparatus.

SUMMARY OF THE INVENTION

According to one aspect of the invention there is provided a conveyor belt scraper including blade segments each supported by a bracket connectable to a link of a deformable linkage and means acting on the linkages to bias the blade segments against a conveyor belt, wherein the link has a projecting, holed boss and the bracket has a recess to receive the boss with the hole of the boss aligning with a hole in the base of the recess for reception in the aligned holes of a fastener that serves to connect the bracket to the linkage in thermally transmitting relationship.

With this feature heat generated in the blade segment and bracket can advantageously be transmitted through the boss to the linkage, thereby limiting the build up of heat in the assembly.

In the preferred embodiment, the scraper also includes a relatively flexible curtain extending over the linkage, the boss extending through an aperture in the curtain. With this configuration, the curtain protects the linkage from falling material scraped from the conveyor belt, but still allows direct heat transmission to take place from the bracket to the boss and hence to the linkage itself.

The preferred embodiment also includes a relatively stiff plastics deflector extending downwardly, over the upstream side of the curtain, from the blade segment. Advantageously, the bracket supports the blade segment and deflector in such a position that the deflector has a substantially vertical orientation at initial installation and throughout subsequent movement relative to the belt as the blade segment wears. With this feature, falling material scraped from the belt will apply less impact and wear to the deflector which is accordingly better able to protect the curtain, which in turn is then able better to protect the linkage itself from that falling material.

In some embodiments, the blade segment may be mounted detachably to the forward end of the bracket with an upper edge of the deflector held captive between the blade segment and the bracket. In a particularly preferred arrangement, the deflector has an upper edge which is clamped between the blade segment and a transverse plate forming part of the bracket and the scraper includes a heat conductor extending around the upper edge of the deflector to provide a heat conduction path extending from the blade segment to transverse plate. The heat conductor may comprise a U-shaped metal plate which extends over the upper edge of the deflector and which is clamped, with the upper edge of the deflector, between the blade segment and the transverse plate.

The invention also provides a parallelogram linkage for a conveyor belt scraper as summarised above, the linkage including a plurality of links hinged to one another with an operatively upper one of the links carrying a projecting, holed boss which is receivable in heat transmitting relationship in a recess in a blade segment supporting bracket which in use supports a blade segment that performs a scraping action on a section of the width of a conveyor belt.

Still further the invention provides a blade segment supporting bracket for a conveyor belt scraper as summarised above, the bracket carrying a transverse blade segment for scraping a section of the width of a conveyor belt and being formed with a recess having a hole in a base thereof, the recess being dimensioned to receive, in heat transmitting relationship, a holed boss projecting from a link of the linkage with the holes in the boss and in the base of the recess in alignment to receive a fastener which connects the bracket to the linkage.

Other features of the invention are set forth in the appended claims.

BRIEF DESCRIPTION OF THE DRAWINGS

The invention will now be described in more detail, by way of example only, with reference to the accompanying drawings.

In the drawings.

DESCRIPTION OF THE ILLUSTRATED EMBODIMENTS

Figure 1A:
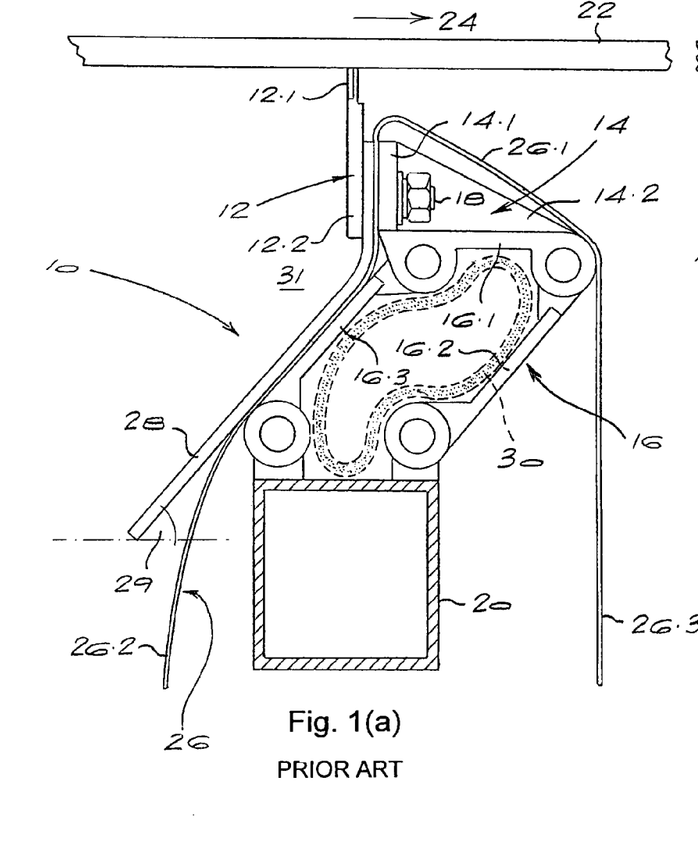
FIG. 1(a) shows a sectional view illustrating relevant components of a conventional conveyor belt scraper at an initial installation position.
Figure 1B:
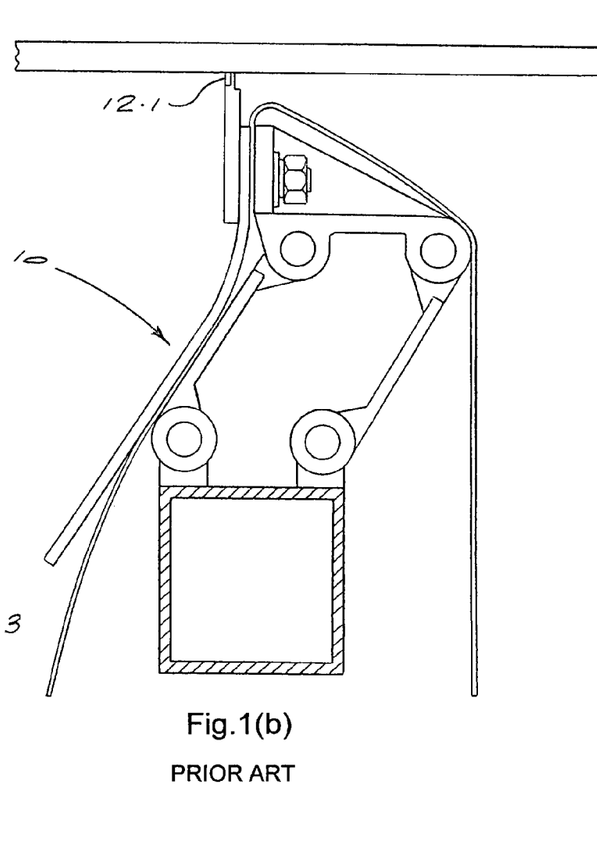
FIG. 1(b) shows the same components after wear of the blade segment has taken place.

FIGS. 1(a) and 1(b) illustrate components of a conventional conveyor belt scraper of the type sold under the trade mark DIRTWHACKER®. The scraper 10 includes a blade segment 12 supported by a steel blade segment support bracket 14. The blade segment 12 consists of an insert 12.1 of tungsten carbide or other suitably hard material mounted in a rebate in a steel plate 12.2.

The scraper 10 also includes a parallelogram linkage 16 including hingedly connected steel links 16.1, 16.2 and 16.3. The bracket 14 is formed as an integral part of the upper link 16.1 and includes an upright steel plate 14.1 reinforced by gussets 14.2. The plate 12.2 is bolted to the plate 14.1 by bolts 18. The links 16.2 and 16.3 of the linkage 16 are hinged to a steel support bar 20 which forms part of the linkage and also forms part of the support structure for the scraper 10. Together with the bracket 14, the linkage 16 forms a blade segment support.

The numeral 22 indicates the bottom run of a conveyor belt which moves in the direction 24.

Sandwiched and clamped between the plates 12.2 and 14.1 is a flexible curtain 26 made of natural rubber. A middle region 26.1 of the curtain extends over the linkage 16 while end regions 26.2 and 26.3 of the curtain hang down over the upstream and downstream sides of the linkage and support bar 20. In addition there is a fairly rigid deflector 28 made of polyethylene or polypropylene. The bolts 18 pass through holes in the curtain and in the upper edge of the deflector to clamp those components between the blade segment support bracket 14 and the plate 12.2 of the blade segment.

A flexible, gas-inflatable hose or tube 30, shown in FIG. 1(a) in broken outline, passes through the parallelogram linkage 16 as illustrated.

Persons skilled in the art and familiar with the operation of scrapers such as the illustrated scraper 10 will understand that the hose acts internally on the linkage 16 in such a manner as to bias the blade segment 12 upwardly against the underside of the conveyor belt 22 in order to scrape material off the belt. Material which is scraped off the belt falls down in the region indicated by the numeral 31, with the curtain 26 preventing such material from falling directly on the linkage or support structure. At the same time, the relatively rigid and robust deflector 28 prevents the material from falling directly onto the curtain and damaging it.

Those skilled in the art will also understand that the components illustrated in FIGS. 1(a) and 1(b) form a single scraper assembly, and that in a full scraper there will be a plurality of such assemblies mounted side by side on the bar 20 with a common hose 30 passing through the linkages of all the assemblies.

Still further, those skilled in the art will recognize that a major advantage of the scraper 10 is its ability to maintain an effective scraping action even as the individual blade segments wear with use. This is illustrated by FIG. 1(b) which shows how the parallelogram linkage, acted upon internally by the pressurised hose 30 (not shown in FIG. 1(b) or subsequent cross-sectional views), will continually bias the blade segment towards the belt as wear takes place.

Reference may also be made to U.S. Pat. No. 6,076,656 for a description of the principles of operation of a conveyor belt scraper of the type in question.

As explained above, at least some of the heat generated by the friction between the scraping edge of the blade segment 12 and the belt will be removed, during normal operation, by the material which is scraped from the belt. However if the belt is run "dry", excessive heat can build up in the blade segment, leading to heat deterioration of the rubber curtain 26 and of the deflector 28. Deformation of these components may lead to loosening of the connection provided by the bolts 18, resulting in possible vibration of the blade segment and "chattering" thereof against the belt surface and leading eventually to premature failure of the scraper.

In this regard it will be noted that the curtain and deflector effectively act as thermal insulators between the blade segment 12 and bracket 14. Although the bolts 18 will conduct some heat from the blade segment to the bracket, it will be understood that this heat conduction takes place through holes in the curtain and deflector and could in fact worsen the heat degradation of these components in regions around the bolt holes.

FIGS. 2(a), 2(b) and 3 to 5 illustrate an embodiment of the present invention. In these Figures, components corresponding to components seen in FIGS. 1(a) and 1(b) are designated by like reference numerals.

In the embodiment of FIGS. 2(a), 2(b) and 3 to 5, as before, the blade segment 12 consists of an insert 12.1 of tungsten carbide or other hardmetal or suitably hard material fixed in a rebate in a plate 12.2. In this case, the plate 12.2 is welded transversely to the end of a generally channel-shaped member 40 of the bracket 14 which has a web 40.1 and upstanding side walls 40.2. In a central region, the wall 40.1 is shaped to define a downwardly facing recess 40.3. The base 40.4 of the recess is formed with a laterally elongate slot 40.5.

In other embodiments of the invention, the plate 12.2 could be bolted to the end of the member 40 as described subsequently with reference to FIGS. 6(a), 6(b) and 7 to 9.

Figure 2A:
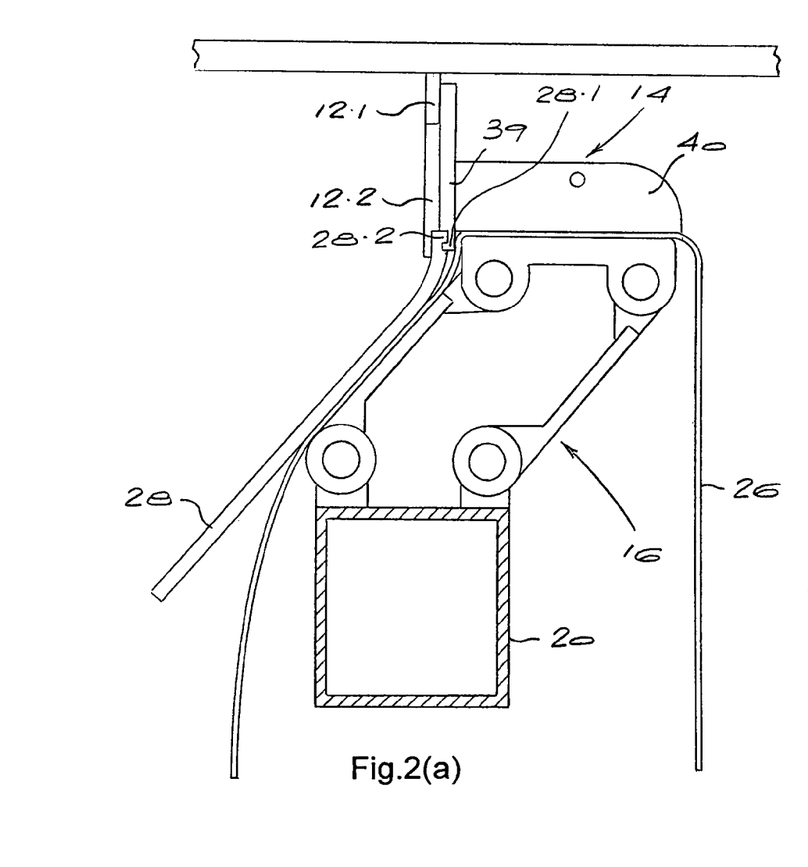
FIG. 2(a) shows a sectional side view illustrating relevant components of a conveyor belt scraper according to the invention at an initial installation position.
Figure 2B:
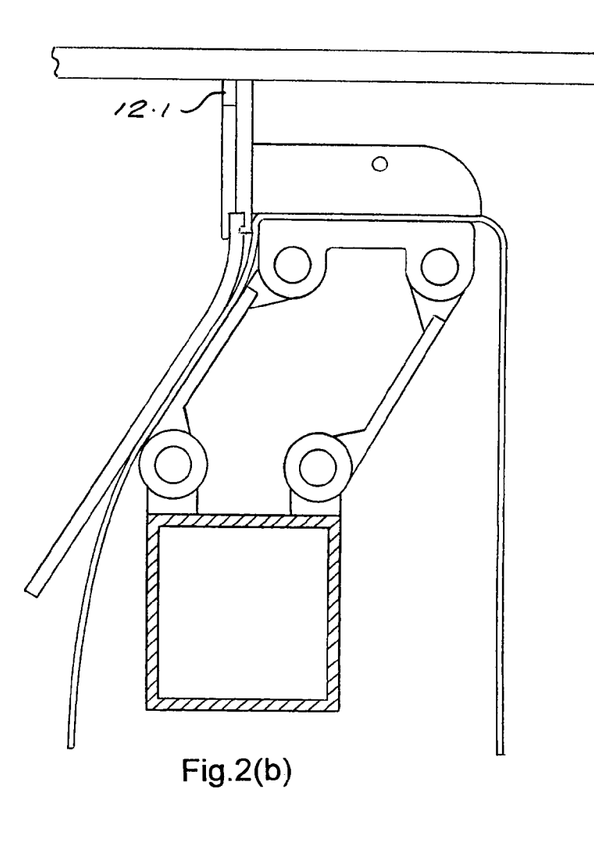
FIG. 2(b) shows the same components after wear of the blade segment has taken place.
Figure 3:
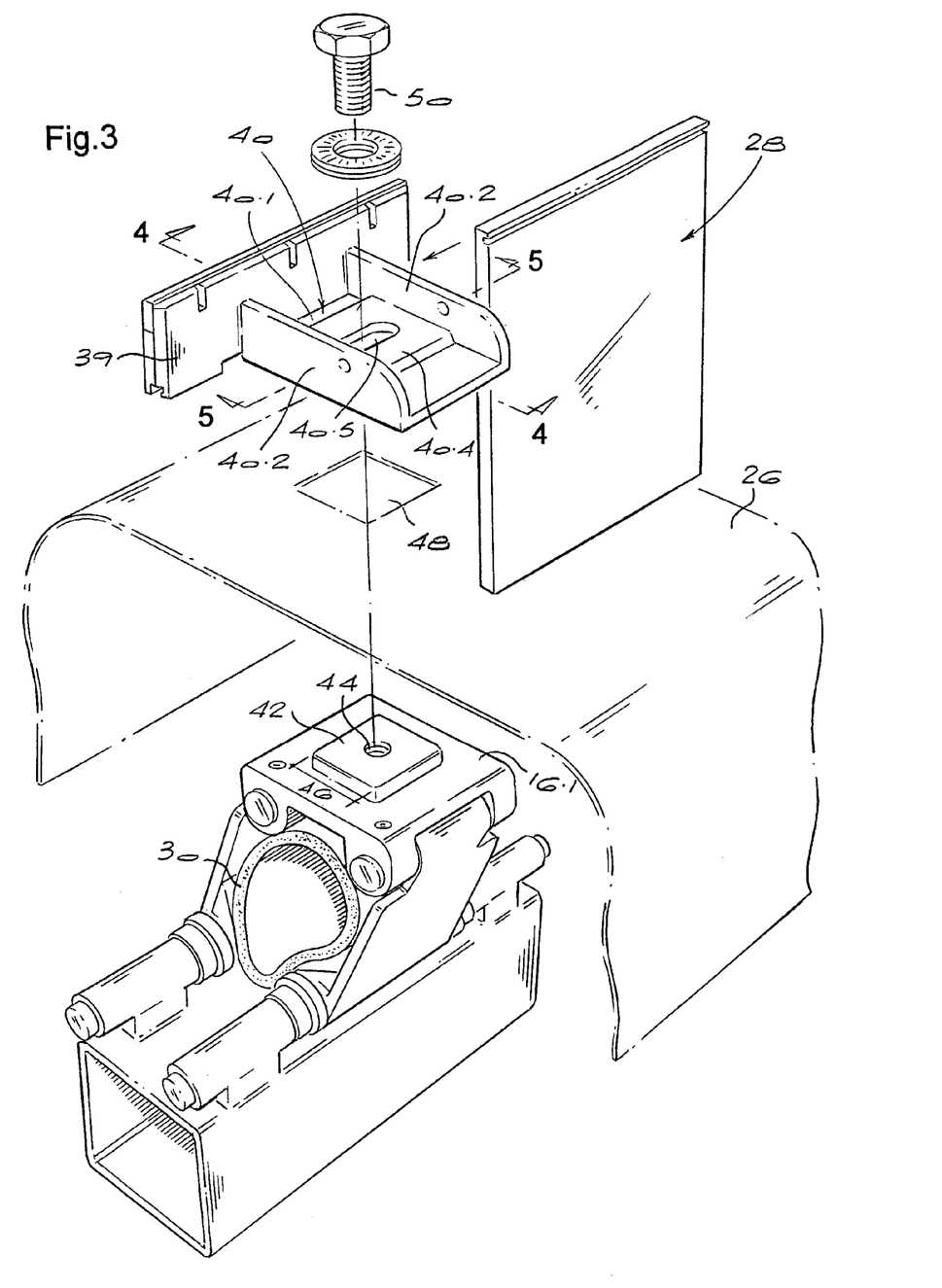
FIG. 3 shows an exploded perspective view illustrating certain of the components illustrated in FIGS. 2(a) and 2(b)
Figure 4:
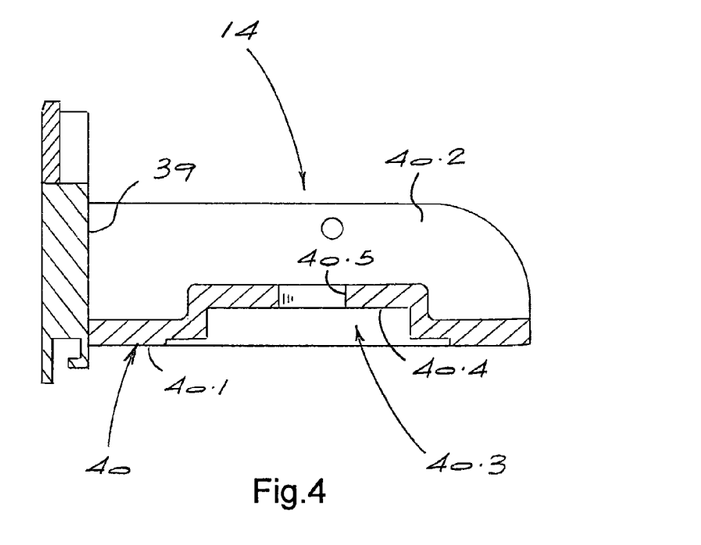
FIG. 4 shows a cross-section at the line 4-4 in FIG. 3.
Figure 5:
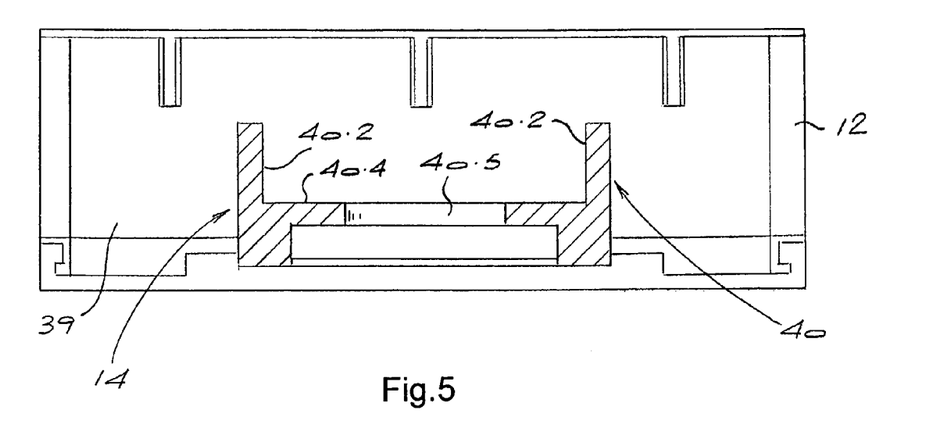
FIG. 5 shows a cross-section at the line 5-5 in FIG. 3.

The upper link 16.1 of the parallelogram linkage 16 is formed with an upstanding, square boss 42 formed centrally with a tapped hole 44. The dimension 46 of the boss, i.e. the dimension in the direction of conveyor belt travel, is very slightly less than the corresponding internal dimension of the recess 40.3.

The curtain 26 in this embodiment is formed with a hole 48 having square dimensions very slightly greater than those of the boss 42. During assembly, the curtain is laid over the upper link 16.1 with the boss projecting through the hole 48. The bracket 14 is then placed over the curtain with the boss received snugly in the recess 40.3. A single bolt 50 is then passed downwardly through the slot 40.5 and is threaded into the tapped hole 44, thereby connecting the bracket 14, and hence the blade segment 12, securely to the linkage.

Although the curtain 26 is trapped between the bracket and the linkage, the direct contact between the boss 42 and the bracket 14 provides a substantial heat transmission path. Thus if the conveyor belt should for any reason be run "dry", heat which would otherwise accumulate in the blade segment and bracket is transmitted, by conduction through the boss, to the linkage 16. Such heat can then be dissipated in the linkage 16, in the support bar 20 or in other components of the scraper support structure.

The improved transmission of heat afforded by the configuration illustrated in FIGS. 2(a), 2(b) and 3 to 5 tends to prevent build-up of heat to a level at which degradation of the rubber could take place. There is also a direct, bolted connection between the bracket 14 and the linkage 16 which is unlikely to loosen even if some deterioration of the rubber should take place.

As shown in FIG. 2(a) the deflector 28 has a groove 28.1 close to its upper edge. This groove forms a bead 28.2 at the upper edge which locates in a corresponding groove at the lower edge of the plate 12.2. The mounting of the deflector 28 is accordingly such that it does not affect transmission of heat from the bracket 14 to the linkage 16. An alternative mounting system is described below with reference to FIG. 10.

The embodiment described above will, it is believed, prolong the life of the scraper. Other complementary measures to prolong scraper life are described below.

As indicated above, FIG. 1(a) illustrates a conventional scraper after considerable wear of the insert 12.1 has taken place and blade segment replacement is necessary. In a normal installation, this might for instance be when approximately two thirds of the vertical extent of the insert 12.1 of the blade segment has worn away.

As also indicated above, the deflector 28 is provided to prevent scraped material from falling, in the zone 31, onto the flexible curtain 26. However, referring to FIG. 1(a) in particular, it will be seen that at the initial installation position, the deflector itself lies at a relatively shallow angle 29 to the horizontal and so is itself directly exposed to the full impact of the falling material and to substantial frictional wear as the material slides over it. Although the angle which the deflector makes with the horizontal decreases as wear of the blade segment takes place, i.e. the deflector approaches a more vertical orientation, it is still largely exposed to the impact of the scraped material as it falls even when blade segment wear has taken place to the extent that the scraper is in the position illustrated in FIG. 1(b). Thus the deflector itself is subject to substantial and rapid wear, particularly in cases where highly abrasive material is scraped from the belt.

In FIGS. 6(a), 6(b) and 7 to 9, which illustrate another embodiment of the invention, components corresponding to those described previously are designated with the same reference numerals. In this embodiment, the plate 12.2 is bolted to a plate 39 at the forward end of a bracket 14 which is considerably longer than the bracket 14 seen in FIGS. 2(a), 2(b) and 3 to 5.

Figure 6A:
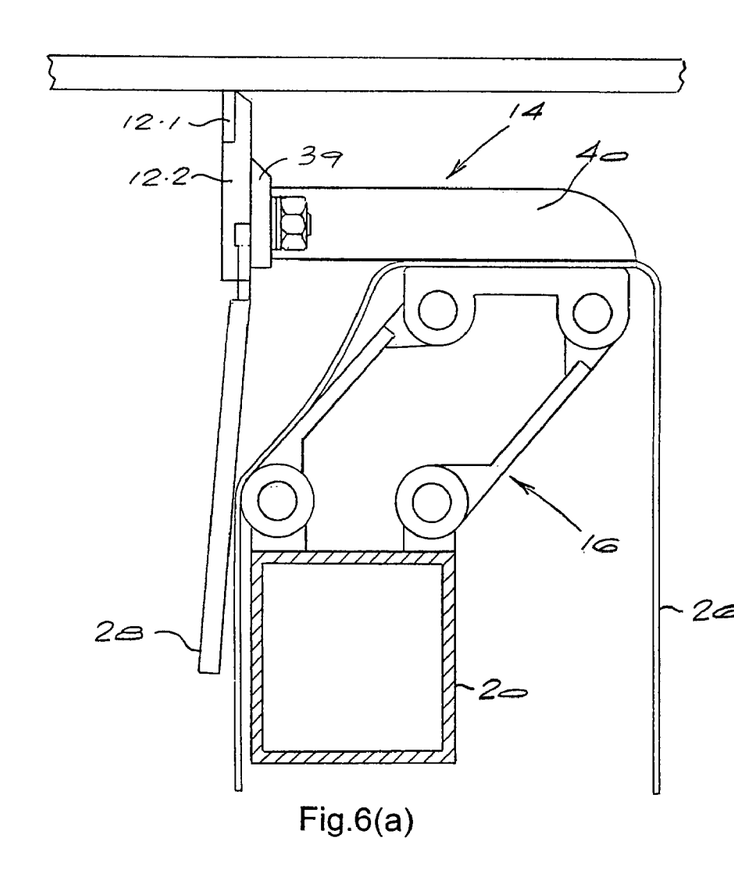
FIG. 6(a) illustrates another embodiment of the invention at an initial installation position.
Figure 6B:
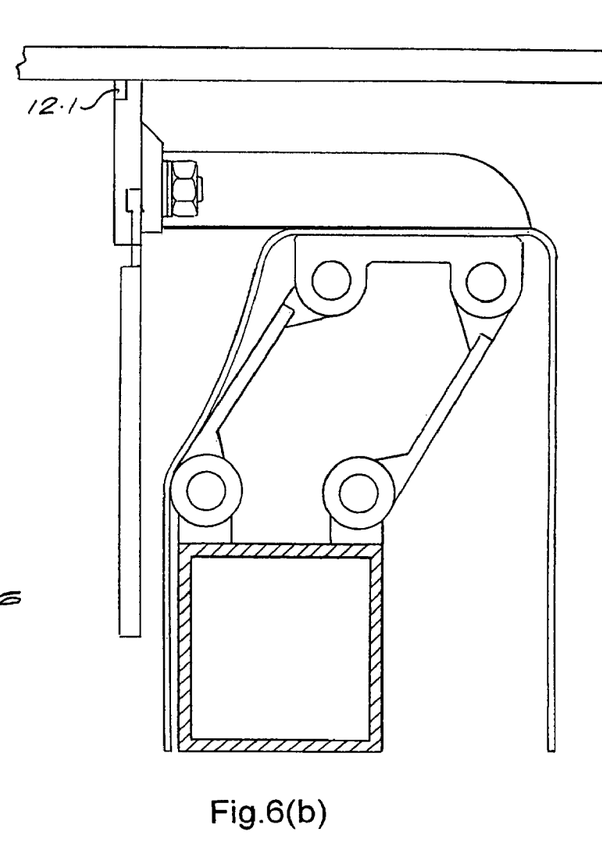
FIG. 6(b) illustrates the embodiment of FIG. 6(a) after substantial wear of the blade segment has taken place.
Figure 7:
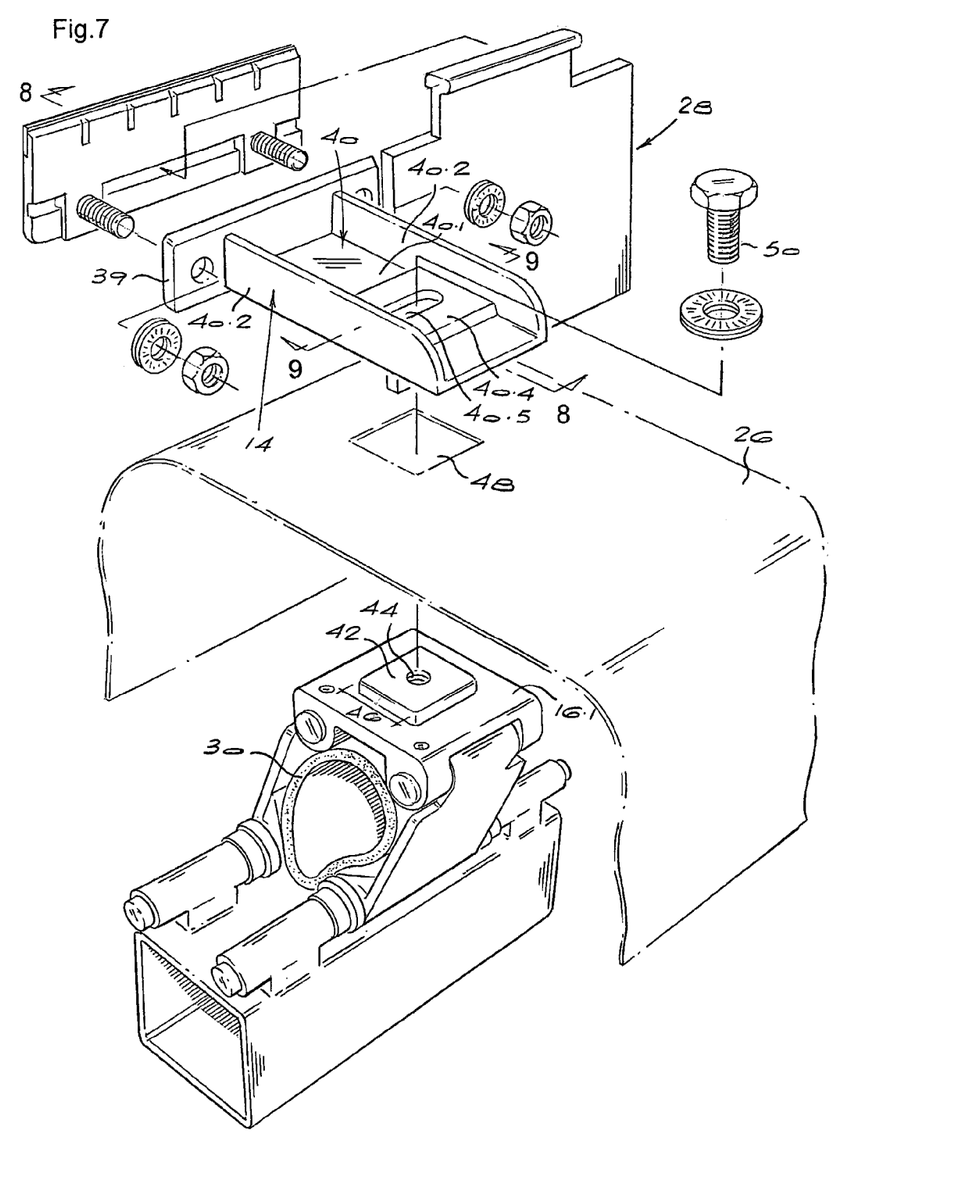
FIG. 7 shows an exploded, perspective view illustrating components of the embodiment of FIGS. 6(a) and 6(b)
Figure 8:
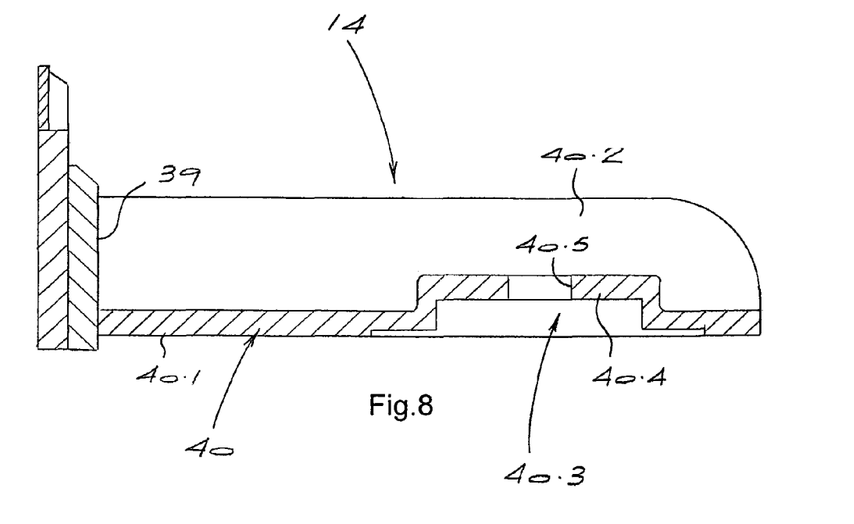
FIG. 8 shows a cross-section at the line 8-8 in FIG. 7.
Figure 9:
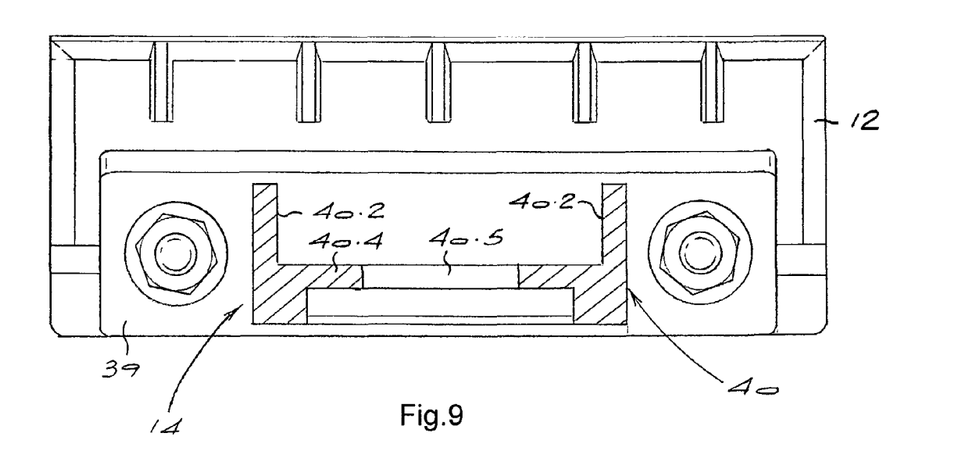
FIG. 9 shows a cross-section at the line 9-9 in FIG. 7.

FIG. 6(a) illustrates the position at installation and before wear of the insert 12.1 has taken place. Even in this position, it will be seen that the deflector has a substantially vertical orientation. This is attributable to the length of the bracket 14, which is sufficient even at this stage to support the blade segment 12 and the deflector 28 generally ahead of the curtain, with the deflector at a substantially vertical orientation. As wear of the insert 12.1 takes place, and as illustrated by FIG. 6(b), the blade segment 12 and deflector 28 will move further and further ahead of the curtain while still maintaining the vertical orientation.

The substantial vertical orientation of the deflector 28 throughout the range of expected movement to accommodate normal wear of the insert 12.1 is advantageous in that scraped material will apply considerably less impact to the deflector and will be able to slide more easily over the deflector surface than is the case with a deflector oriented in the manner shown in FIGS. 1(a) and 1(b). In other words, the falling material in the zone 31 will cause reduced frictional wear.

The deflector and hence the curtain can accordingly be expected to remain cooler and to wear less rapidly, leading in turn to reduced wear of the linkage 16. It is believed that this feature, particularly when combined with the cooling effect provided by heat transmission from the boss 42, will contribute to prolongation of the life the scraper 10.

Figure 10:
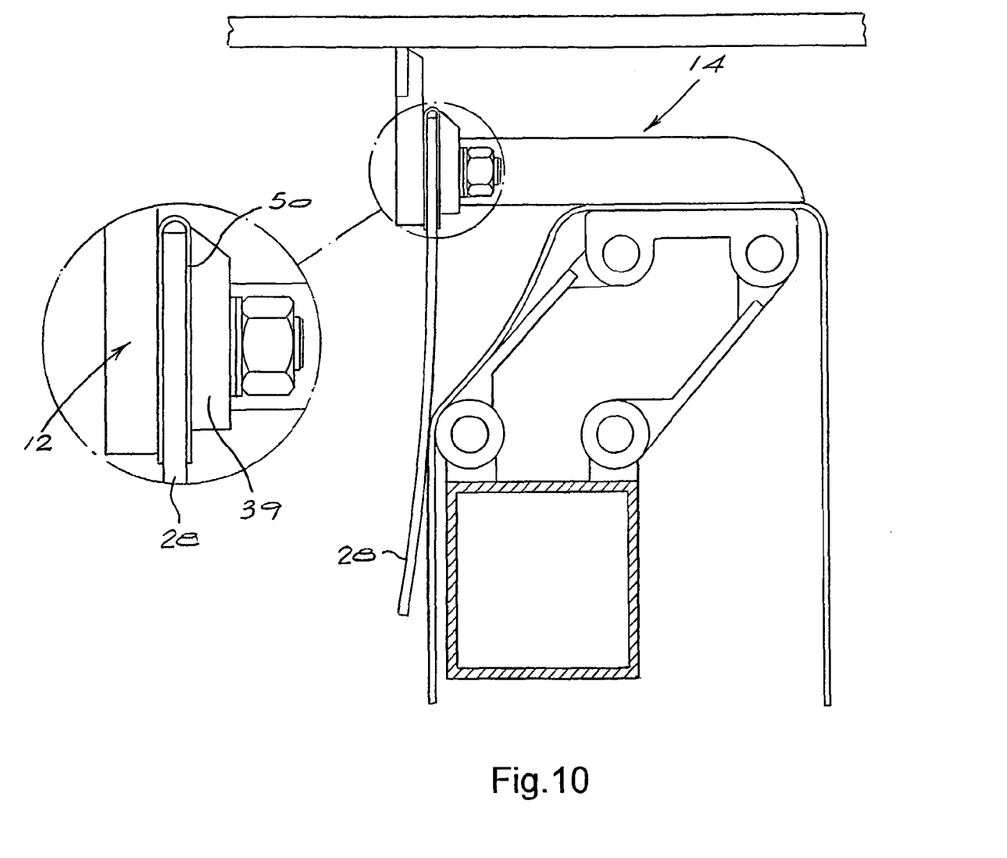
FIG. 10 shows a cross-section, corresponding to that of FIGS. 2(a) and 6(a) of another embodiment of the invention.

FIG. 10 shows a cross-sectional view, corresponding to that of FIGS. 2(a) and 6(a) of another embodiment of the invention. In this case, the upper edge of the deflector 28 is sheathed in a U-shaped, mild steel plate 50. With this plate, the upper edge of the deflector is clamped between the blade segment 12 and the plate 39 at the forward end of the bracket 14.

The plate 50 in this embodiment extends for the full length of the plate 39 and provides a heat conduction path passing around the upper edge of the deflector 28 from the blade segment 12 to the bracket 14. This reduces heat transmission directly into the deflector itself and, in turn reduces the likelihood of heat deterioration of the deflector material. When compared to the earlier embodiments of the invention, it is also considered advantageous that the thickness of the deflector material is not reduced by the presence of the groove 28.1. This increases the mechanical strength of the deflector in this region. In combination with the plate 50 this feature reduces the chances of excessive heat build-up in a relatively thin section of the deflector where heat deterioration could lead to early failure of the deflector.

FIG. 10 shows the incorporation of the heat conduction plate 50 in an embodiment similar to that of FIGS. 2(a), 2(b) and 3 to 5. It will however be understood that a similar plate could be incorporated in an embodiment such as that of FIGS. 6(a), 6(b) and 7 to 9 where the longer bracket 14 is employed.

The invention claimed is:

1. A conveyor belt scraper comprising:
   blade segments;
   a bracket supporting each of the blade segments;
   a deformable linkage including a plurality of links, with one of the links, in use, being an upper link;
   means acting on the linkages to bias the blade segments against a conveyor belt; and
   an upstanding, holed boss located on the upper link;

wherein the bracket is connectable to the deformable linkage;

wherein the bracket includes a recess to receive the boss; and wherein the bracket includes a hole in the base of the recess such that the hole of the boss aligns with the hole in the base of the recess for reception in the aligned holes of a fastener that serves to connect the bracket to the linkage in thermally transmitting relationship.

2. A conveyor belt scraper according to claim 1 wherein the bracket further includes a channel section which includes a web and upstanding side walls; and wherein the recess is formed in the web of the channel section.

3. A conveyor belt scraper according to claim 1 or claim 2 wherein the scraper further comprises, for each blade segment, a relatively flexible curtain extending over the linkage with the boss extending in use through an aperture in the curtain and into the recess.

4. A conveyor belt scraper according to claim 3 wherein the scraper further comprises, for each blade segment, a relatively stiff plastics deflector extending downwardly, over the upstream side of the curtain, from the blade segment; and wherein the bracket is of such a length and supports the blade segment and deflector in such a position that the deflector has a substantially vertical orientation at initial installation and throughout subsequent movement relative to the belt as the blade segment wears.

5. A conveyor belt scraper according to claim 4 wherein the deflector includes a bead at an upper edge thereof which is engaged in an undercut recess at the lower edge of the blade segment.

6. A conveyor belt scraper according to claim 4 wherein the blade segment is mounted detachably to a forward end of the bracket with an upper edge of the deflector held captive between the blade segment and the bracket.

7. A conveyor belt scraper according to claim 4 or claim 6 wherein the bracket includes a transverse plate which is used together with the blade segment to clamp an upper edge of the deflector between the transverse plate and the blade segment; and wherein the scraper includes a heat conductor extending around the upper edge of the deflector to provide a heat conduction path extending from the blade segment to the transverse plate.

8. A conveyor belt scraper according to claim 7 wherein the heat conductor includes a U-shaped metal plate which extends over the upper edge of the deflector and which is clamped, with the upper edge of the deflector, between the blade segment and the transverse plate.

9. A blade segment supporting bracket for a conveyor belt scraper according to any one of claims 1 to 8 wherein the bracket carries a transverse blade segment for scraping a section of the width of a conveyor belt;

wherein the bracket includes a recess and a hole in a base of the recess; and wherein the recess is dimensioned to receive, in heat transmitting relationship, an upstanding, holed boss located on the upper link of the linkage such that the holes in the boss and in the base of the recess are in alignment to receive a fastener to connect the bracket to the linkage.

10. A parallelogram linkage for a conveyor belt scraper according to any one of the preceding claims wherein the linkage includes:

a plurality of links hinged to one another, with one of the links, in use, being an upper link; and an upstanding, holed boss located on a upper link;

wherein the boss is receivable in heat transmitting relationship in a recess of a blade segment supporting bracket which in use supports a blade segment that performs a scraping action on a section of the width of a conveyor belt.

11. A parallelogram linkage according to claim 10 wherein the hole of the boss is capable of receiving a fastener to connect the bracket to the boss in heat transmitting relationship.

\* \* \* \* \*